United States Patent [19]

Adam

[11] 4,274,366
[45] Jun. 23, 1981

[54] PIG RESTRAINING DEVICE

[76] Inventor: Kenneth L. Adam, 1472 Helser Hall, Ames, Iowa 50010

[21] Appl. No.: 122,569

[22] Filed: Feb. 19, 1980

[51] Int. Cl.³ .................. A61D 3/00; A01K 29/00
[52] U.S. Cl. ..................... 119/98; 119/103
[58] Field of Search ............... 119/98, 96, 103

[56] References Cited

U.S. PATENT DOCUMENTS

| | | | |
|---|---|---|---|
| 833,692 | 10/1906 | Neff | 119/103 |
| 1,073,756 | 9/1913 | Higgason | 119/103 |
| 1,572,307 | 2/1926 | Nottingham | 119/103 |
| 1,705,115 | 3/1929 | Hollestelle | 119/103 |
| 2,663,283 | 12/1953 | Julius | 119/103 |
| 2,788,767 | 4/1957 | Dooley | 119/103 |
| 2,965,071 | 12/1960 | Scott et al. | 119/103 |
| 3,483,846 | 12/1969 | Quint | 119/98 |
| 3,693,595 | 9/1972 | Stewart | 119/98 |
| 4,084,544 | 4/1978 | Wehmeyer | 119/103 |
| 4,120,266 | 10/1978 | Oloff et al. | 119/103 |
| 4,123,993 | 11/1978 | Whitely | 119/103 |
| 4,140,082 | 2/1979 | Easton | 119/103 |
| 4,148,280 | 4/1979 | Masude et al. | 119/103 |
| 4,151,812 | 5/1979 | Miller | 119/103 |

Primary Examiner—Hugh R. Chamblee
Attorney, Agent, or Firm—Henderson & Sturm

[57] ABSTRACT

An animal restraint for confining an animal; e.g., a pig, in a head down, belly forward position for the performing of typical operations such as castration, docking, etc., the restraint featuring a simple frame having transverse upper and lower members and a hinged gate adapted when closed to overlie the members with the animal's hocks confined between the gate and the top member and the animal's belly confined between the gate and the lower member, the latter member being in the form of a forwardly facing saddle-like structure.

10 Claims, 6 Drawing Figures

PIG RESTRAINING DEVICE

BRIEF SUMMARY OF THE INVENTION

The prior art abounds with animal restraint devices for the purposes herein set forth; i.e., the performing of animal husbandry operations known to mankind. The nature and scope of the various types of operations need not be detailed here. Suffice it to note that the major requirements of any animal restraint are that it be simple, inexpensive, safe and as humane as possible. Safety involves safety to both the animal and the person performing the operation, since protection of both is important. A humane restraint requires that discomfort to the animal be avoided so far as possible so that the animal remains fairly docile and does not kick and thrash around. Simplicity entails quick and easy grasping of the animal in the restraint, sure retention of the grip or grasp and simple and easy release so as to free the animal as quickly as possible.

The most commonly employed gripping devices are straps, buckles, clamps, etc., but most of these must be individually manipulated, requiring considerable dexterity and quickness on the part of the operator. Clamps are apt to be too severe on the animal and not readily releasable. Another requirement is portability; that is the restraint must be capable of being easily transported and readily mountable and dismountable as respects a variety of types of supports. Further, the restraint must be sturdy and foolproof.

The restraint provided by the present invention satisfies all these requirements. It comprises essentially a simple frame having means for the mounting thereof on a wide variety of supports, in a position elevated above the ground so that the animal may be confined in a head down, belly forward position, which position has been found to be suitable in substantially all circumstances, particularly in the castration operation. Cooperative with the frame is a hinged gate which confines the animal by its rear hocks and additionally about a substantial portion of its belly. Because both gripping means cooperative with the frame are carried on the gate, both means are operable in unison by the use of only one hand on the part of the operator, leaving his other hand free to latch the gate in place after the animal is properly confined or restrained. The frame is easily and simply constructed and all connections are preferably welded to provide a rigid, strong and lightweight structure. The gate may be made of a single piece of rod of cylindrical section, formed to a rectangular shape except for shorter portions which provide part of the means for hinging of the gate to the frame.

DETAILED DESCRIPTION

Figures 1, 2:
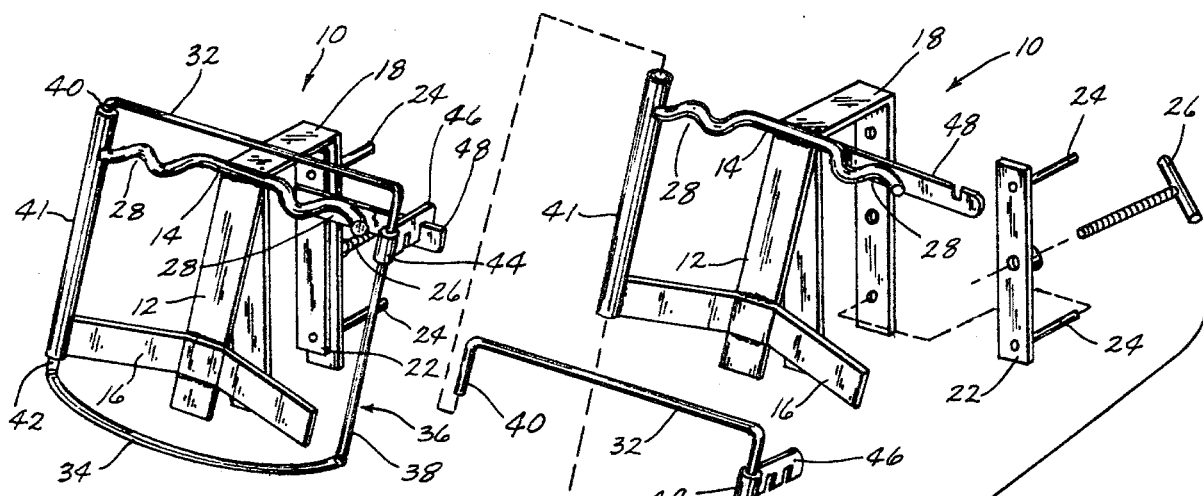
FIG. 1 is a perspective of the assembled and closed restraint, the animal being omitted.
FIG. 2 is an "exploded" perspective of the restraint, showing its components.
Figures 3, 4:
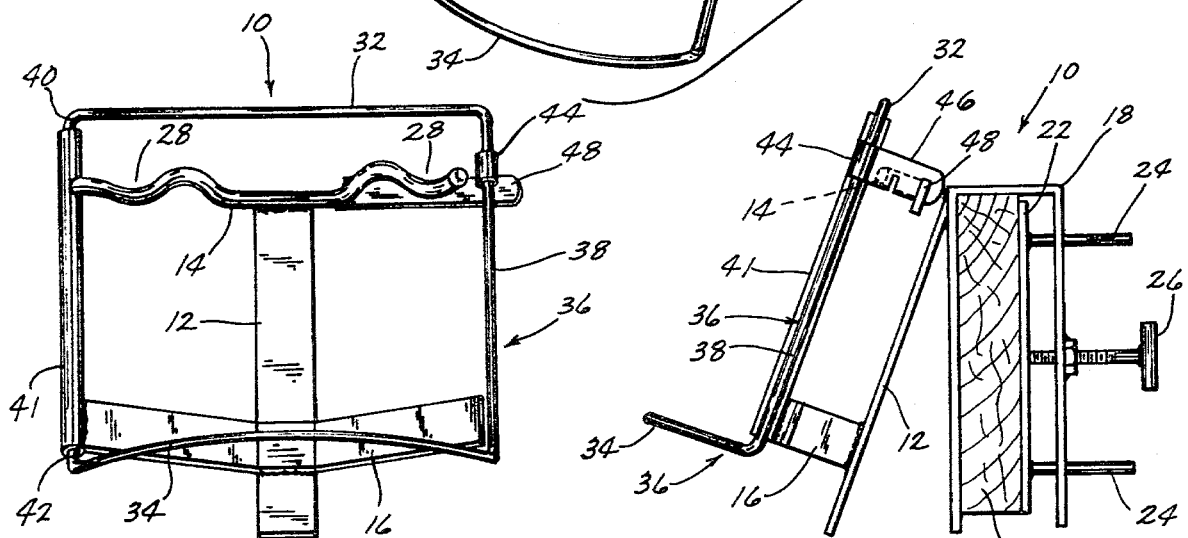
FIG. 3 is a front elevation of the restraint.
FIG. 4 is a side view of the restraint.

The preferred embodiment of the restraint chosen for purposes of the present disclosure comprises a main body part or frame 10 having a central member 12 and top and bottom cross or transverse members 14 and 16 respectively. This frame may be seen as being generally upright but in use it has a sloping position because of the manner of mounting and arranging the frame on a support means 18, best seen in FIG. 4 as an inverted U adapted to be carried by any suitable support, such as a fence rail 20; although, any equivalent will carry the frame so that it has requisite portability and flexibility for convenient use about the farmstead. Means for clamping the frame and U-shaped means 18 to any selected support takes the form of a plate 22 guided by pins 24 and moved into clamping position by a hand screw 26. The components so far described at 12, 14, 16 and 18 may be welded together to form a rigid, lightweight structure.

Figures 5, 6:
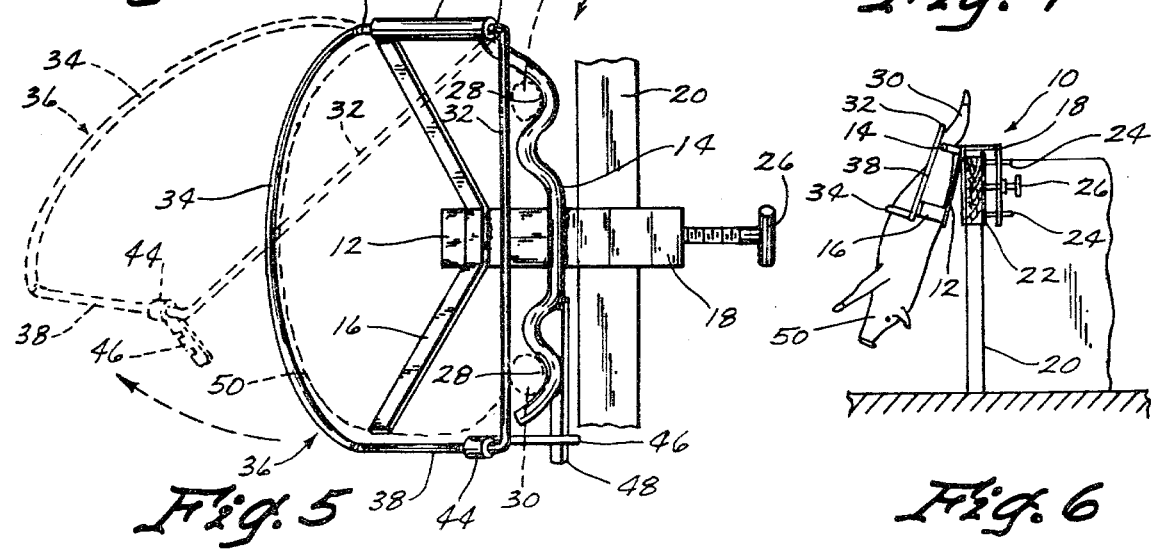
FIG. 5 is a plan view, the broken lines illustrating the open position of the gate.
FIG. 6 is an elevation, on a reduced scale, showing a typical use of the restraint holding a pig in a head down, belly forward position.

The top member 14 is of such configuration as to provide a pair of spaced apart pocket means 28 in the form of forwardly opening U's for receiving the animal's rear hocks, as indicated in dotted lines at 30 in FIG. 5. The lower member is shaped in the form of a forwardly facing saddle structure to receive the animal's back portion (FIG. 6). The purpose of this design is to suspend the animal in a head down, belly forward position, clear of the ground or floor so that the animal's chances of injuring its head are minimized if not eliminated. The sloping posture of the restraint also clears the animal's lower back, shoulders and head from the fence or equivalent support, again in the interests of providing a more humane restraint.

In order that the animal is confined to the receiving means afforded by the top and bottom members 14 and 16, upper and lower gripping means 32 and 34, respectively, are provided. These cooperate respectively with the upper and lower members 14 and 16. In the embodiment shown, the gripping means are unitary parts of a swinging gate 36, and the upper and lower means are joined by an integral upright member 38, the gate being preferably formed of a round steel rod bent to the desired shape, leaving at the side opposite to the member 38 upper and lower pintles 40 and 42. Rigidly secured, as by welding the top and bottom frame members 14 and 16, is a steel tube 41. The gate is assembled to the tube by springing the upper and lower parts 32 and 34 apart and inserting the pintles into opposite ends of the tube, the tube and pintles thus cooperating to afford a hinge means 42 about the axis of which the gate is swingable between closed and open positions as best seen in full lines and broken lines, respectively, in FIG. 5. The gate is releasably held in closed position by latch means 44, here comprising a latch element 46 pivotally mounted on the upright member 38 of the gate and having lower notches selectively cooperative with a latch-receiving bar 48 welded to and extending outwardly from the frame top member 14.

The use and operation of the restraint will now be described. The frame is initially mounted on a selected support, such as the fence rail 20, and the clamp means securely tightened. The gate is swung to its open position. The animal, here a pig 50, for example is caught, hung head down, belly forward, and its hocks and back positioned in the upper and lower pocket means and saddle structure. The gate is then easily closed and latched and the animal is secured. When the operation has been completed, the latch is released and the gate easily swung open. Because of the gate feature, both the upper and lower gripping means are operative in unison, requiring the use of only one hand. The plurality of lower notches on the latch element enables selection of the amount of grip to be applied to the hocks and belly, depending upon the size of the animal. As already stated, the restraint is easily portable, being of lightweight, rigid construction, having relatively few and simply designed moving parts not likely to get out of order or be damaged in use. The instant design was made for animals weighing in the range of about 35 pounds. Larger restraints may be easily constructed for larger animals, following the teachings of the present example. Because the latch element is pivotally as well as vertically slidably mounted on the upright member 38 of the gate, it will descend by gravity into locking relation to the latch bar 48. Other features will readily occur to those versed in the art, all without departing from the spirit and scope of the invention.

I claim:

1. An animal restraint, comprising a main body including means for the mounting thereof on a support elevated above the ground, said body including upper pocket-like means spaced apart laterally for receiving the hocks of the hind legs of the animal, first gripping means carried by the body for movement between a closed position cooperative with the pocket means for grasping the hocks to suspend the animal in a head down, belly front position and an open position for receiving and releasing the hocks, said body further including second means spaced below the first means and providing a forwardly facing saddle structure for receiving the animal's back, and second gripping means carried by the body for movement between a closed position overlying the animal's belly and cooperative with the saddle structure to confine the animal and an open position for receiving and releasing the animal, said first and second gripping means being interconnected for movement in unison relative to the body.

2. The animal restraint of claim 1, in which the first and second gripping means are hinged to the body on a common generally upright hinge means.

3. The animal restraint of claim 2, including selectively releasable and engageable latch means for unlocking and locking the gripping means from and to the body.

4. The animal restraint of claim 1, in which the first and second means take the form of a gate in which the first means comprises a transverse top member and the second means comprises a transverse bottom member and at least one generally upright member extends between and is rigidly connected to the top and bottom members.

5. The animal restraint of claim 4, in which one of the upright members comprises part of a hinge disposed in a generally upright position and the body carries a cooperative hinge part for carrying the gate on the body for selective movement between open and closed positions.

6. The animal restraint of claim 1, in which the upper means comprises a transverse bar having laterally spaced apart forwardly opening U-shaped portions for receiving the hocks and the gripping means comprises a member operative to overlie and close said portions with the hocks confined between said member and portions.

7. The animal restraint of claim 1, in which the body comprises a frame having a central upright member and transverse top and bottom members rigidly affixed to the central member and comprising the upper and lower means.

8. The animal restraint of claim 7, in which the first and second gripping means are unitary upper and lower transverse parts of a gate, said parts being spaced apart on the order of and respectively adapted in closed position to overlie the transverse body members.

9. The animal restraint of claim 8, including generally upright hinge means mounting the gate along one side to the corresponding end portions of the transverse body members.

10. The animal restraint of claim 9, including latch means for selectively locking and unlocking the gate to and from the opposite end of at least one of said transverse body members.

* * * * *